United States Patent
Shimura

(10) Patent No.: US 10,026,252 B2
(45) Date of Patent: Jul. 17, 2018

(54) MONEY DISPENSING DEVICE AND ACCOUNTING DEVICE

(71) Applicant: TOSHIBA TEC KABUSHIKI KAISHA, Tokyo (JP)

(72) Inventor: Takahiro Shimura, Gotenba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/422,494

(22) Filed: Feb. 2, 2017

(65) Prior Publication Data

US 2017/0256114 A1 Sep. 7, 2017

(30) Foreign Application Priority Data

Mar. 7, 2016 (JP) ................. 2016-043861

(51) Int. Cl.
| | | |
|---|---|---|
| G07F 9/02 | (2006.01) | |
| G07F 5/24 | (2006.01) | |
| G07D 11/00 | (2006.01) | |
| G07F 7/04 | (2006.01) | |
| G07G 1/00 | (2006.01) | |
| G08B 21/18 | (2006.01) | |
| G07F 19/00 | (2006.01) | |
| G07D 1/00 | (2006.01) | |
| G07D 9/00 | (2006.01) | |

(52) U.S. Cl.
CPC ................ *G07F 5/24* (2013.01); *G07D 1/00* (2013.01); *G07D 9/00* (2013.01); *G07D 11/009* (2013.01); *G07D 11/0048* (2013.01); *G07F 7/04* (2013.01); *G07F 19/201* (2013.01); *G07G 1/0036* (2013.01); *G08B 21/18* (2013.01)

(58) Field of Classification Search
CPC ..... G07F 5/24; G07F 7/04; G07F 9/02; G07F 9/04; G07F 19/00; G07D 1/00; G07D 1/02; G07D 1/06; G07D 11/0006; G07D 11/0009; G07D 11/0018; G07D 11/0048; G07D 2201/00; G07G 1/036; G08B 21/18
See application file for complete search history.

(56) References Cited

U.S. PATENT DOCUMENTS 9,437,069 B1 * 9/2016 Blake ..................... G07D 3/128
2013/0035024 A1 2/2013 Okawa
(Continued)

FOREIGN PATENT DOCUMENTS

| EP | 0710932 | 5/1996 |
| EP | 2690608 | 1/2014 |

OTHER PUBLICATIONS

Extended European Search Report dated Aug. 8, 2017, filed in European counterpart Patent Application No. 17159115.9, 9 pages.

*Primary Examiner* — Mark J Beauchaine
(74) *Attorney, Agent, or Firm* — Patterson & Sheridan, LLP

(57) ABSTRACT

In one embodiment, a money dispensing device has a storage device, an attaching/detaching mechanism and a control device. The attaching/detaching mechanism detachably supports a storage bag. When the storage device to store money has overflowed, the money stored in the storage device is discharged to a storage bag. The control device outputs information indicating that the storage bag is not attached when the storage bag is not attached to the attaching/detaching mechanism.

11 Claims, 12 Drawing Sheets

(56) References Cited

U.S. PATENT DOCUMENTS

2013/0140132 A1 6/2013 Matsuhisa et al.
2015/0235498 A1* 8/2015 Laufhutte .............. G07D 9/008
                                                                           453/3

* cited by examiner

MONEY DISPENSING DEVICE AND ACCOUNTING DEVICE

CROSS-REFERENCE TO RELATED APPLICATION

This application is based upon and claims the benefit of priority from the prior Japanese Patent Application No. 2016-043861, filed on Mar. 7, 2016, the entire contents of which are incorporated herein by reference.

FIELD

Embodiments described herein relate generally to a money dispensing device and an accounting device.

BACKGROUND

Conventionally, self POS (Point of Sales) terminals in which a customer himself/herself executes an operation of sales registration and a settlement operation of a commodity displayed in a store have been proposed, for example. The self POS terminal like this houses a money dispensing device which stores coins and bills (collectively called "money") and dispenses change to a customer in the inside of a chassis with door.

In the above-described money dispensing device, an upper limit number of moneys capable of being stored is determined. The above-described money dispensing device moves moneys of the number exceeding the upper limit number from a storage portion of the money dispensing device to a storage bag. The storage bag is detachably attached to the money dispensing device. A door of the self POS terminal is opened by a salesclerk or the like of a store, and the storage bag is attached to the money dispensing device in the self POS terminal. For the reason, when the salesclerk or the like forgets to attach the storage bag, the money dispensing device cannot move the moneys of the number exceeding the above-described upper limit number into the storage bag.

However, since a storage bag exists inside the chassis of the self POS terminal, a salesclerk or the like hardly notice that the salesclerk has forgotten to attach a storage bag.

DETAILED DESCRIPTION

Figure 1:
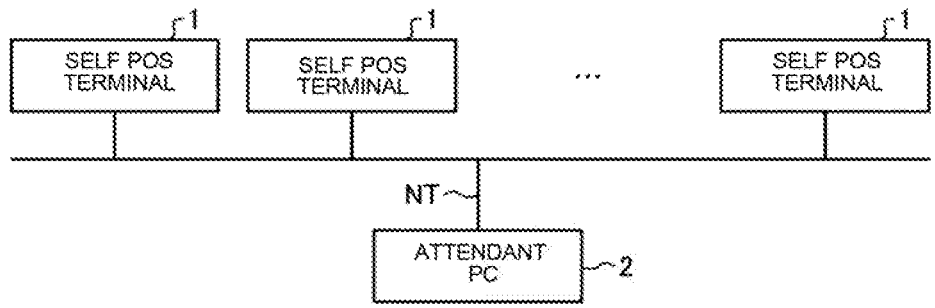
FIG. 1 is a schematic diagram showing a system according to an embodiment.

According to one embodiment, a money dispensing device has a storage device, a dispensing port, an attaching/detaching mechanism, a conveying mechanism, and a control device. The storage device stores received money. From the dispensing port, money of a money amount required for a money amount of the received money, out of the money stored in the storage device is paid. The attaching/detaching mechanism detachably supports a storage bag to which the money stored in the storage device is to be discharged. The conveying mechanism conveys the money stored in the storage device to the dispensing port or the storage bag attached to the attaching/detaching mechanism. The control device controls the conveying mechanism so that the money is conveyed from the storage device to the dispensing port when money payment is required for the money amount of the received money. The control device controls the conveying mechanism so that the money is conveyed from the storage device to the storage bag when the storage device has overflowed. Further, the control device outputs information indicating that the storage bag is not attached when the storage bag is not attached to the attaching/detaching mechanism.

Hereinafter, money dispensing devices and accounting devices according to embodiments will be described with reference to FIG. 1 to FIG. 10. In the drawings, the same symbols indicate the same or similar portions. In the embodiments, a self POS (Point of Sales) terminal in which a customer himself/herself executes an operation for sales registration and an operation for settlement processing will be described as an example of an accounting device. In addition, a self POS terminal in which a salesclerk executes an operation for sales registration processing, and a customer executes an operation for settlement processing may be made an accounting device. In addition, in the embodiments, a coin change machine which a self POS terminal has will be described as an example of a money dispensing device. In addition, a bill change machine may be made a money dispensing device. In addition, embodiments are not limited to the description described below.

FIG. 1 is a schematic diagram showing a system including self POS terminals according to an embodiment. As shown in FIG. 1, a system has a plurality of self POS terminals 1 installed in a store, and an attendant PC (Personal Computer) 2. Each of the self POS terminals 1 and the attendant PC 2 are electrically connected to each other by a communication line NT such as a LAN (Local Area Network) line.

The self POS terminal 1 has a registration unit and a settlement unit. The above-described registration unit accepts an operation for sales registration processing, and reads a symbol such as a bar code or a two-dimensional code attached to a commodity to be purchased by a customer. The registration unit reads the above-described symbol, to perform a sales registration processing. The above-described settlement unit accepts an operation for settlement processing, and performs a settlement processing, based on commodity information corresponding to the symbol read by the above-described registration unit. A customer himself/herself performs any of an operation for sales registration processing in the registration unit and an operation for settlement processing in the settlement unit. That is, the self POS terminal 1 executes the sales registration processing, based on the operation for sales registration which the customer has performed. In addition, the self POS terminal 1 executes the settlement processing, based on the operation for settlement processing which the customer has performed. In addition, the detailed configuration of the self POS terminal 1 will be described with reference to FIG. 2A, FIG. 2B, FIG. 5.

Here, the sales registration processing is a processing to display and store commodity information such as a commodity name and a price of the relevant commodity, based on an inputted commodity code. The commodity code is discrimination information capable of discriminating a commodity. The above-described symbol (a bar code, a two-dimensional code or the like) is converted, and thereby the commodity code is acquired. That is, the symbol attached to a commodity is read, and thereby the commodity code is inputted. In addition, the settlement processing is a processing to display a total money amount and a change amount relating to a transaction with the customer, based on the commodity information subjected to the sales registration processing.

In the vicinity of each of the self POS terminals 1, a camera (not shown) to monitor an aspect that a customer performs an operation for sales registration processing and an operation for settlement processing is provided. The attendant PC 2 displays a video of the operation for sales registration processing and the operation for settlement processing of the customer in each of the self POS terminals 1 which has been imaged by the camera. An attendant who is a salesclerk of the store looks at the video displayed on the attendant PC 2, to monitor the operation for sales registration processing and the operation for settlement processing of the customer, and thereby checks injustice by the customer, for example. In addition, the attendant PC 2 displays a state of an error which has occurred in the self POS terminal 1. Specifically, the attendant PC 2 displays information to identify the self POS terminal 1 in which an error has occurred. In addition, the attendant PC 2 displays information to identify an error occurrence position.

Figure 2A:
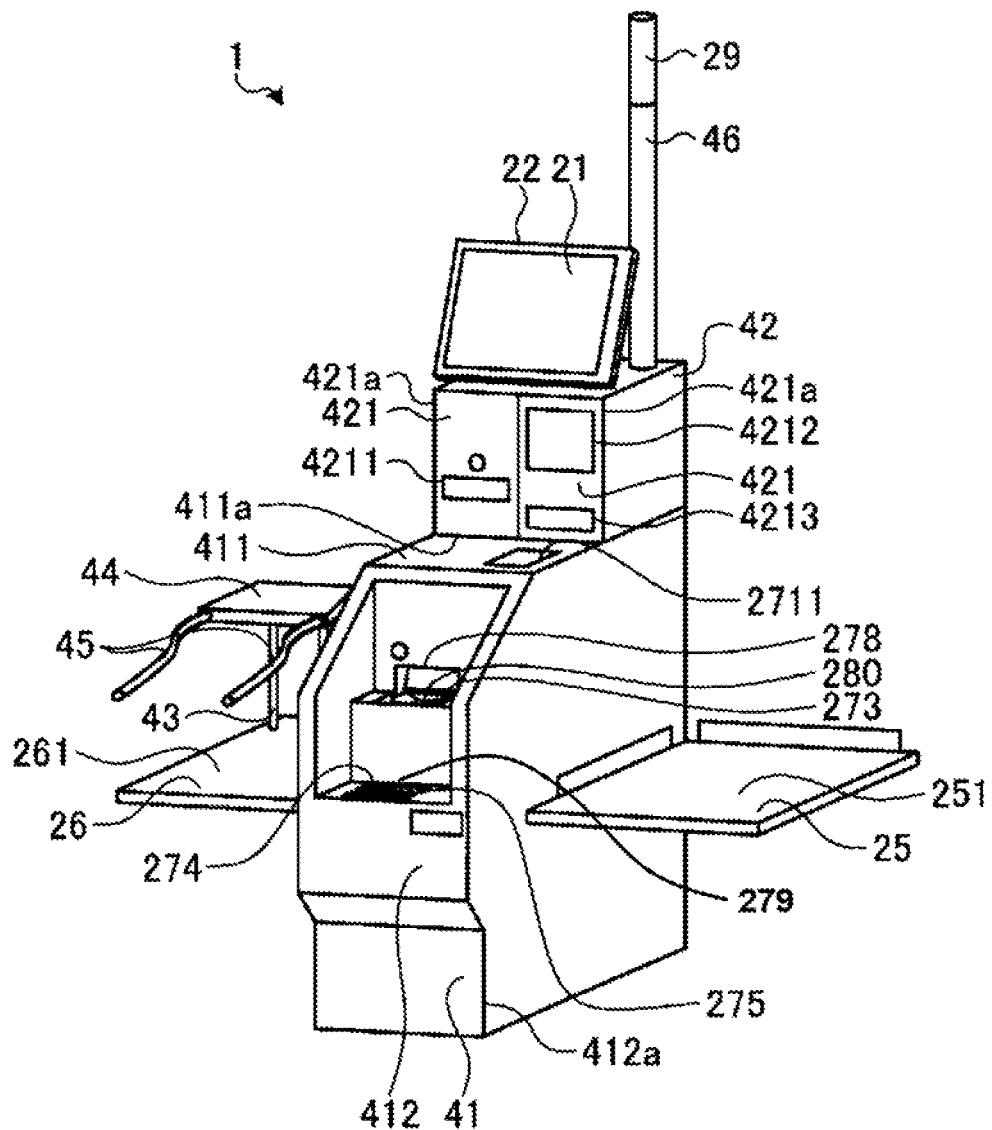
FIG. 2A is a perspective view showing an appearance of the self POS terminal according to the embodiment.

FIG. 2A is a perspective view showing an appearance of the self POS terminal 1. As shown in FIG. 2A, the self POS terminal 1 has a first chassis 41 and a second chassis 42. The first chassis 41 houses a coin change machine 271 and a bill change machine 272 (regarding any machine, refer to FIG. 2B, and FIG. 5). Specifically, the coin change machine 271 and the bill change machine 272 are provided at an upper side inside the first chassis 41 (refer to FIG. 2B). The coin change machine 271 stores coins deposited from a customer for each denomination. In addition, the coin change machine 271 pays a coin so as to dispense a change coin to a customer. The bill change machine 27 stores bills deposited from a customer for each denomination. In addition, the bill change machine 271 pays a bill so as to dispense a change bill to a customer.

The first chassis 41 has an opening portion 2711 for coin reception. The opening portion 2711 exposes a money reception port 3 (refer to FIG. 3) of the coin change machine 271 to the outside of the first chassis 41. In addition, the first chassis 41 has an opening portion 278 for coin payment. The opening portion 278 exposes a dispensing port 273 and a saucer 280 of the coin change machine 271 to the outside of the first chassis 41. In addition, the first chassis 41 has an opening portion for bill reception and payment. The opening portion 279 exposes a bill reception port 274 and a bill dispensing port 275 of the bill change machine 272 to the outside of the first chassis 41. The bill reception port 274 is an inlet which, in order to receive a bill to be inserted by a customer via the opening portion 274 in the bill change machine 272, receives the above-described bill to be inserted. The bill dispensing port 275 is an outlet which, in order to dispense a change bill to a customer via the opening portion 274, pays the bill from the bill change machine 272.

Figure 2B:
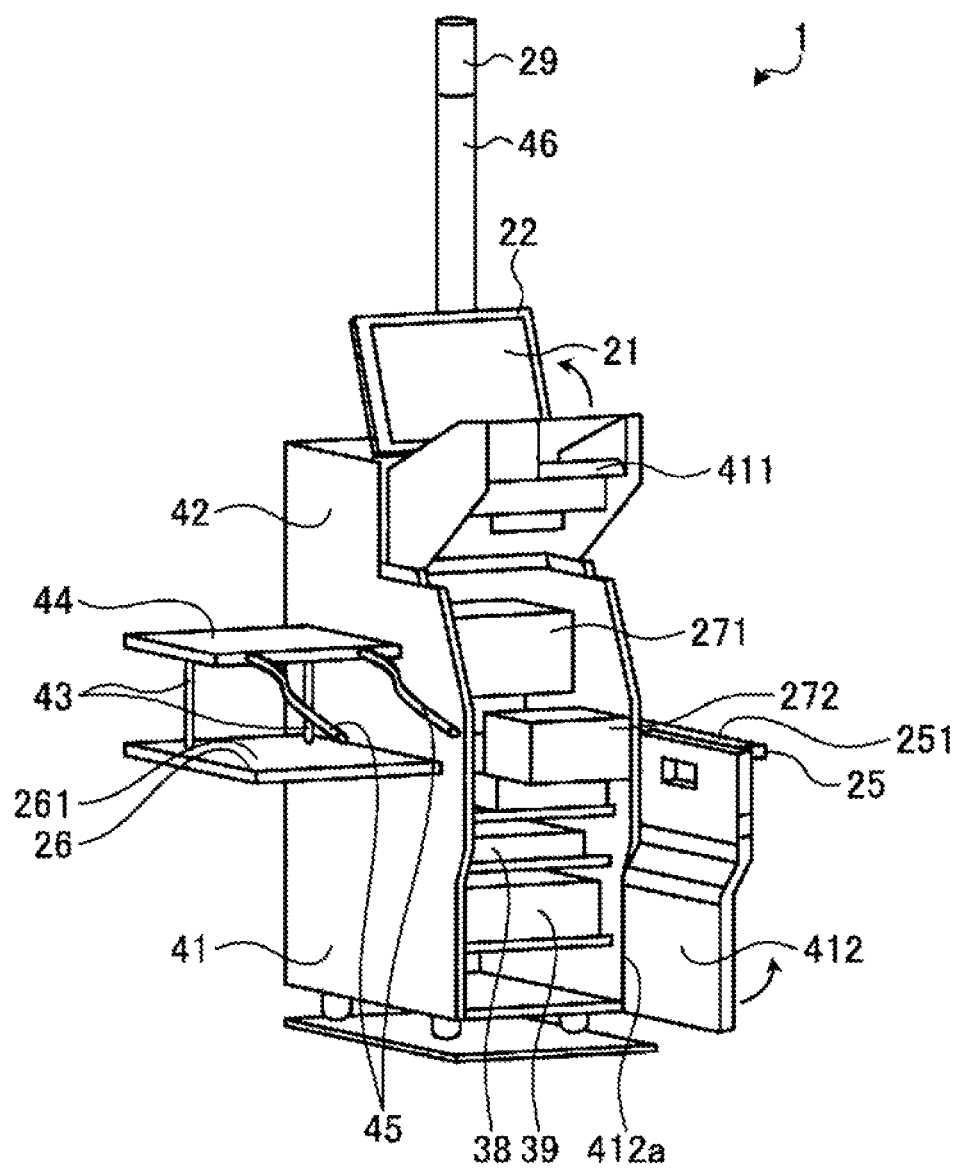
FIG. 2B is a perspective view showing an appearance of the self POS terminal according to the embodiment.

In addition, in FIG. 2A and FIG. 2B, the first chassis 41 has a first door 411 (door) and a second door 412 which can be opened and closed. The first door 411 rotates in the vertical direction around a hinge 411a. The second door 412 rotates in the horizontal direction around a hinge 412a. The rotation of the second door 412 is interfered by the first door 411. Accordingly, in order that the second door 412 is opened, it is necessary that the first door 411 is firstly opened upward.

When the first door 411 is rotated upward, and is opened, the upper side in the first chassis 41 is exposed. As described above, the coin change machine 271 and the bill change machine 272 are provided at the upper side in the first chassis 41. Accordingly, when the first door 411 is opened, the coin change machine 271 and the bill change machine 272 are exposed from the first chassis 41. In addition, when the second door 412 is rotated in the right direction, and id opened, the lower side in the first chassis 41 is exposed. At the lower side in the first chassis 41, a money bar drawer 38 (refer to FIG. 2B) and a control device 39 (refer to FIG. 2B) are provided. Accordingly, when the second door 412 is opened, the money bar drawer 38 and the control device 39 are exposed from the first chassis 41.

In addition, when the second door 412 is rotated in the left direction, and is closed, the money bar drawer 38 and the control device 39 are hidden by the second door 412, and become in a non-exposed state. Then the first door 411 is rotated downward, and is closed, the coin change machine 271 and the bill change machine 272 are hidden by the first door 411, and become in a non-exposed state.

Figure 4A:
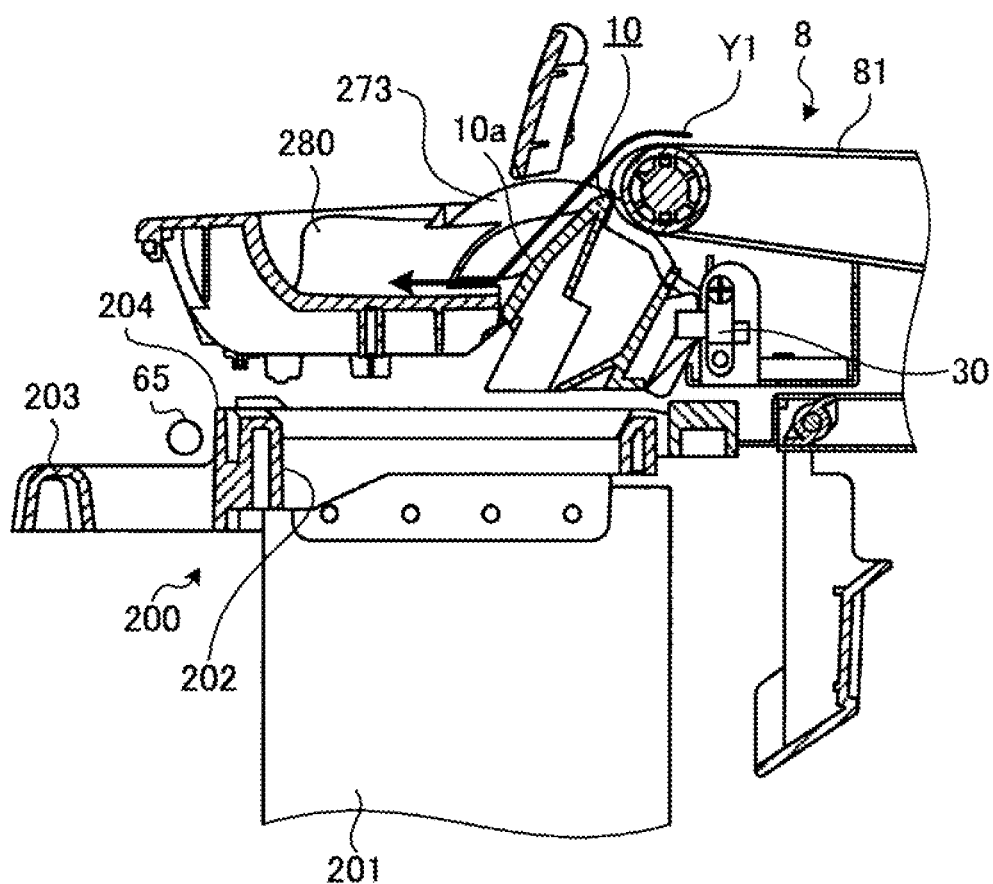
FIG. 4A is a vertical cross sectional right side view showing the vicinity of the dispensing port of the coin change machine according to the embodiment.
Figure 4B:
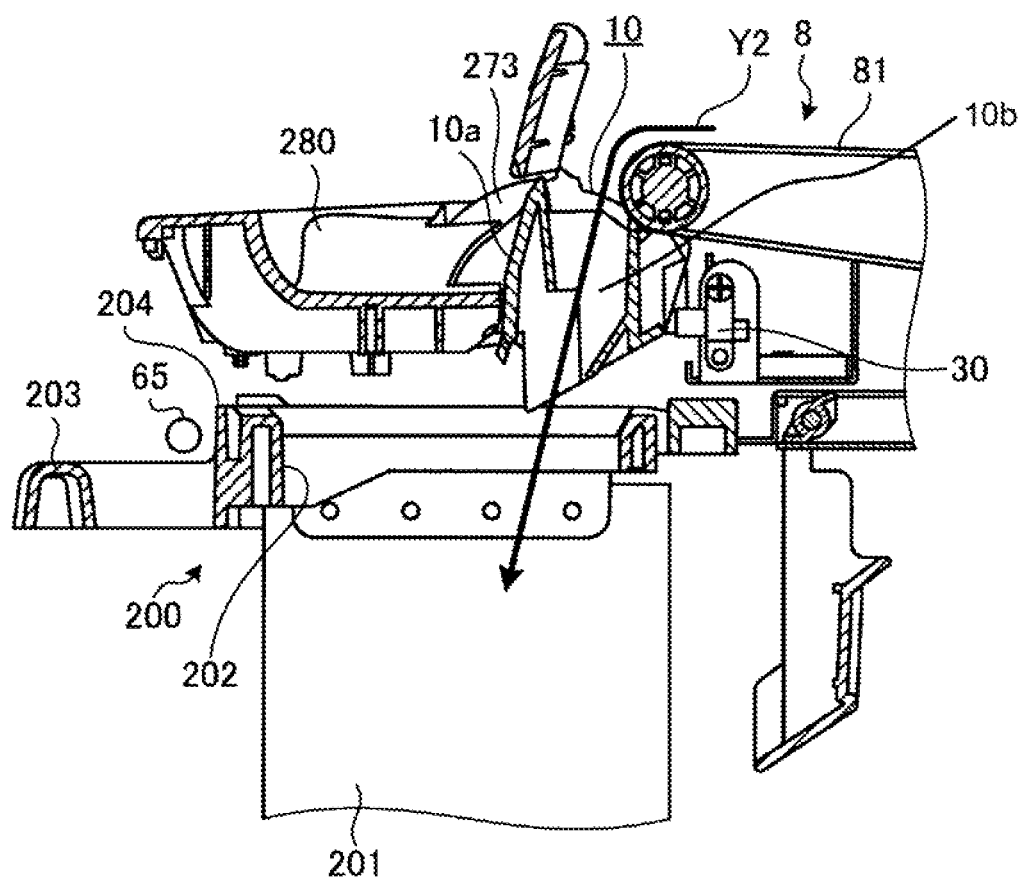
FIG. 4B is a vertical cross sectional right side view showing the vicinity of the dispensing port of the coin change machine according to the embodiment.
Figure 5:
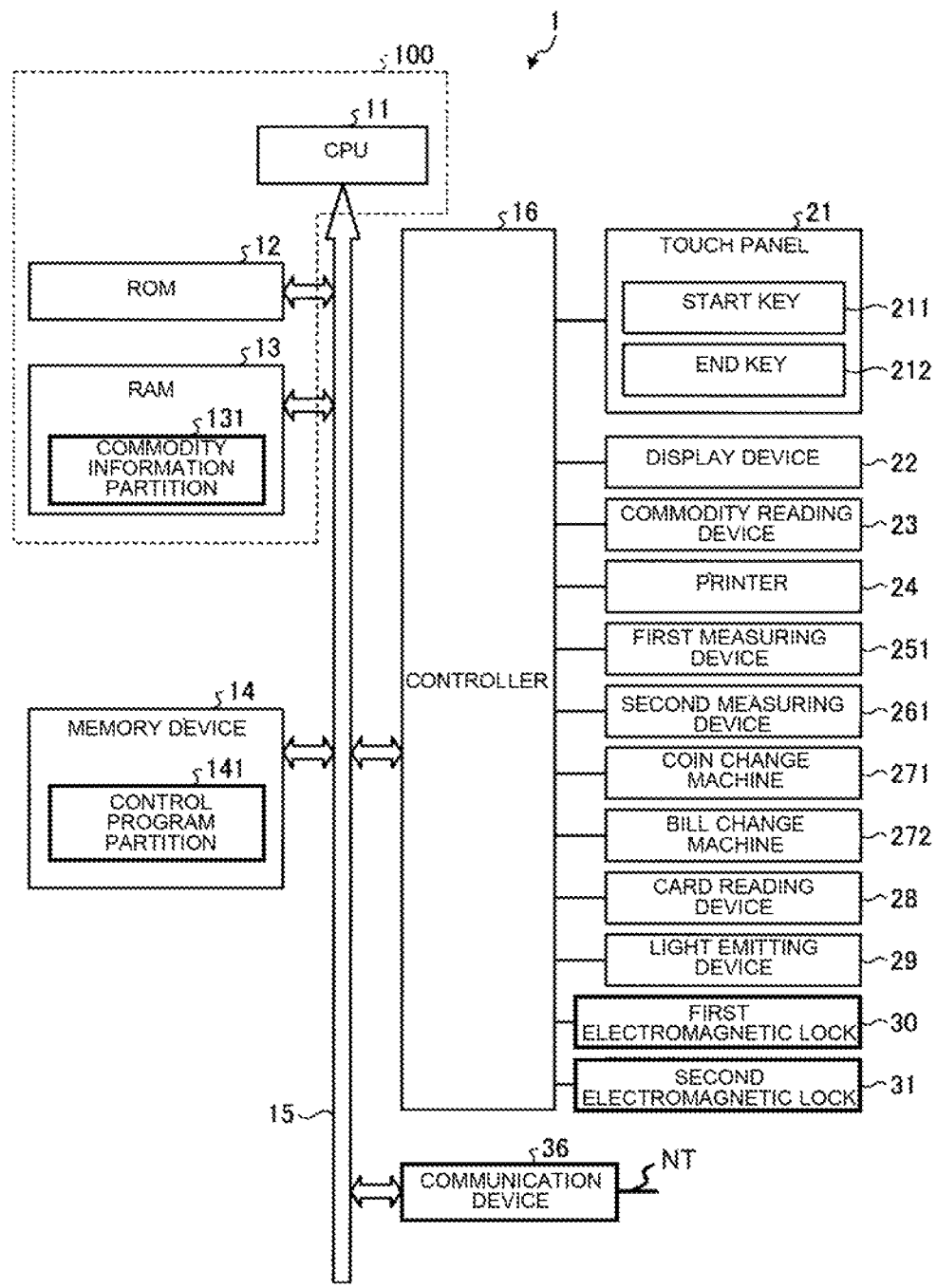
FIG. 5 is a block diagram showing a hardware configuration of the self POS terminal according to the embodiment.

In addition, the first chassis 41 has a first electromagnetic lock 30 (refer to FIG. 4A, FIG. 4B, and FIG. 5). The first electromagnetic lock 30 can be switched between a locked state and an unlocked state. The first electromagnetic lock 30 keeps the first door 411 in a closed state in the locked state, and makes the first door 411 unopenable. The first electromagnetic lock 30 makes the first door 411 openable in the unlocked state. That is, the first electromagnetic lock 30 is a key which can be electromagnetically switched between the unlocked state and the locked state. The first electromagnetic lick 30 contains a solenoid and a lock pin, for example. For example, the solenoid is energized, to locate a lock pin at the unlocked position, and thereby the first electromagnetic lick 30 is switched to the unlocked state. On the other hand, the energization to the solenoid is cutoff, to locate the lock pin at the locked position, and thereby the first electromagnetic lick 30 is switched to the locked state.

In the state that the first door 411 and the second door 412 are closed, when the first electromagnetic lock 30 is made in the locked state, any of the first door 411 and the second door 412 kept in the closed state. When the first electromagnetic lock 30 is made in the unlocked state, the first door 411 becomes openable. And, when the first door 411 is opened, the second door 412 becomes openable.

FIG. 2B is a perspective view showing an appearance of the self POS terminal 1 in the case that the first door 411 and the second door 412 are in the opened state. In the self POS terminal 1 shown in FIG. 2B, since the first door 411 is in the state to be opened upward, the coin change machine 271 and the bill change machine 272 provided inside the self POS terminal 1 become in the exposed state. In addition, since the second door 412 is in the state to be opened in the right direction, the money bar drawer 38 becomes in the exposed state. Further, the control device 39 including a control device 100 (refer to FIG. 5) and a power source becomes in the exposed state.

The description will be returned to FIG. 2A. The first chassis 41 has a placing table 26 and a placing table 25 at the left and right side surfaces, respectively. The placing table 25 has a first measuring device 251. The placing table 26 has a second measuring device 261.

The placing table 25 is a table to place a basket in which a commodity to be purchased is housed. The first measuring device 251 measures a total weight of a basket placed on the placing table 25 and a commodity in the basket. The placing table 26 is a table on which a bag for housing the commodity taken out from the placing table 25 is set. The second measuring device 261 measures a total weight of the bag set on the placing table 26 and the commodity in the bag.

In addition, the placing table 26 has two supports 43, a temporary placing table 44 and two extending rods 45. The two supports 43 extend upward from the upper surface of the placing table 26. The temporary placing table 44 is formed on the upper portions of the supports 43. The extending rods 45 are rods to which a bag (not shown) for housing a commodity with a commodity code that has been read by a commodity reading device 23 (refer to FIG. 5) is set. The bag opens in the state that handles of the bag are hung on the extending rods 45, and thereby it becomes easy to input the commodity in the bag. In addition, the temporary placing table 44 is a table for temporarily placing a breakable commodity (soybean curd or an egg, for example) out of the commodities with commodity codes that have been read by the commodity reading device 23. The commodity placed on the temporary placing table 44 is finally housed in the bag.

The second chassis 42 is provided above the first chassis 41. The second chassis 42 houses the commodity reading device 23 and a card reading device 28 (regarding any device, refer to FIG. 5) at the right side thereof in FIG. 2A. In addition, the second chassis 42 houses a printer 24 (refer to FIG. 5) at the left side thereof in FIG. 2A. The commodity reading device optically reads a symbol (a bar code or the like, for example) attached to a commodity, for example. In the case of performing settlement by a credit card, a credit card is inserted in the card reading device 28. The card reading device 28 reads customer identification information from the credit card. The printer 24 prints the commodity information and the settlement information of the commodity which have been subjected to sales registration processing by the self POS terminal 1 on a receipt sheet, and issues a receipt.

In addition, as shown in FIG. 2A, the second chassis 42 has two third doors 421. Each of the third doors 421 rotates between an open position and a closed position around a hinge 421a thereof. The third doors 421 rotate and thereby are opened and closed in a so-called double-door way. When the third doors rotate to the open positions and become in the open state, the inside of the second chassis 42 is exposed. Accordingly, the commodity reading device 23, the printer 24 and the card reading device 28 become in the exposed state. In addition, when the third doors 421 rotate to the closed state, and become in the closed state, the inside of the second chassis 42 become in the non-exposed state. Accordingly, the commodity reading device 23, the printer 24 and the card reading device 28 become in the non-exposed state.

In addition, the second chassis 42 has a second electromagnetic lock 31 (refer to FIG. 5). The second electromagnetic lock 31 has the same structure and the same function as the first electromagnetic lock 30. That is, the second electromagnetic lock 31 is switched between a locked state and an unlocked state. The second electromagnetic lock 31 keeps the third doors 421 in the closed state in the locked state, and makes the third door 421 unopenable. The second electromagnetic lock 31 makes the third doors 421 openable in the unlocked state. Accordingly, when the second electromagnetic lock 31 is made in the locked state, it becomes impossible to open the third doors 421. In addition, when the second electromagnetic lock 31 is made in the unlocked state, it becomes possible to open the third doors 421.

In addition, the third door 421 has a reading window 4212, a receipt discharge hole 4211, and a card insertion hole 4213. The reading window 4212 is a part of the commodity reading device 23. Regarding the reading window 4212, in order to make a symbol of a commodity to be read by the commodity reading device 23, the relevant commodity is made to pass in front of the reading window 4212 by a customer. The receipt discharge hole 4211 is a hole for discharging a receipt to be issued by the printer 24. The card insertion hole 4213 is a hole in which a card is inserted to the card reading device 28.

In addition, the second chassis 42 has a display device at the upper portion thereof. The display device 22 displays commodity information of a commodity in accordance with an operation for sales registration processing by a customer. In addition, the display device 22 displays settlement information in accordance with an operation for settlement processing by the customer. The display device 22 has a touch panel 21 on the surface thereof. The touch panel 21 plays a role of a key. The touch panel 21 is operated at a position corresponding to one of various keys displayed on the display device 22, and thereby the relevant various key is operated.

In addition, the second chassis 42 has a columnar pole 46 extending upward at the rear side thereof. The pole 46 has a light emitting device 29 at the upper tip portion. The light emitting device 29 emits light when an operation to call an attendant is performed by a customer. In addition, the light emitting device 29 emits light when a storage bag 200 (refer to FIG. 4A) is not attached to the coin change machine 271.

A customer takes out a commodity from a basket placed on the placing table 25, and makes the relevant commodity pass in front of the reading window 4212. The customer makes the commodity pass in front of the reading window 4212, and thereby makes a symbol (a bar code or the like, for example) attached to the relevant commodity to be read by the commodity reading device 23 via the reading window 4212. And the customer inputs the relevant commodity into the bag placed on the placing table 26. The self POS terminal 1 judges whether the customer properly operates, based on whether or not change of measured values (a weight value) of the first measuring device 251 before and after a commodity is taken out from the above-described basket, and change of measured values (a weight value) of the second measuring device 261 before and after the commodity is inputted into the above-described bag are coincident with each other. When the above-described changes of measured values are coincident, the self POS terminal 1 judges that the customer properly operates, and executes a sales registration processing.

Figure 3:
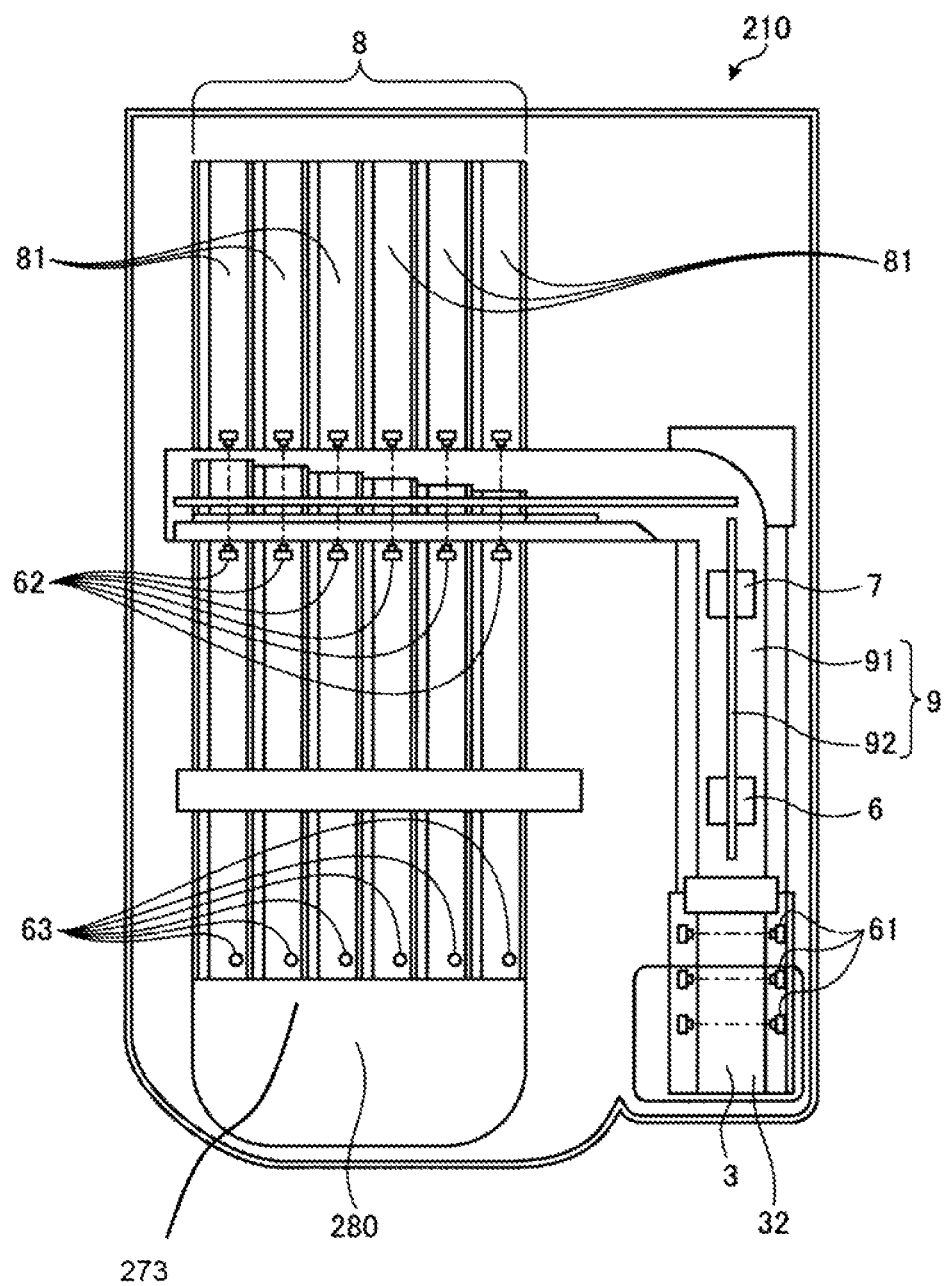
FIG. 3 is a plan view schematically showing an internal structure of the coin change machine according to the embodiment.

Next, the coin change machine 271 will be described. The coin change machine 271 has a main body portion 210 and a cover with which the main body portion 271 is covered. FIG. 3 is a cross-sectional plan view schematically showing a structure of the main body portion 210 of the coin change machine 271. The coin change machine 271 has a first conveying mechanism in the main body portion 210. The first conveying mechanism is a mechanism which conveys a coin to a storage device 8 described later. The first conveying mechanism has a money reception port 3, an input sensor 61, a carrying-in belt 32, a conveying device 9, a discrimination device 6, and a reject device 7.

The money reception port 3 communicates with the opening portion 2711 of the first chassis 41. In order to receive a coin inputted by a customer via the opening portion 2711 into the main body portion 210, the money reception port 3 is an inlet for receiving the above-described inputted coin. The input sensor 61 is provided at the money reception port 3. The input sensor 61 is a transmission type sensor containing a light emitting unit and a light receiving unit. The input sensor 61 detects the above-described inputted coin at the money reception port 3. The carrying-in belt 32 is provided on a bottom surface portion of the money reception port 3. When the input sensor 61 detects a coin, the carrying-in belt 32 conveys the relevant coin into the main body portion 210.

The conveying device 9 conveys the coin carried in the main body portion 210 to the storage device 8 in the main body portion 210. The conveying device 9 has a conveying surface 91 and a conveying belt 92. The conveying surface 91 supports the lower surface of the coin during conveyance. The conveying belt 92 is an endless belt which rotates by receiving a drive force of a money reception motor 57 (refer to FIG. 6). The conveying belt 92 moves the coin by making the coin slide on the conveying surface 91, while making contact with the upper surface of the coin on the conveying surface 91.

The discrimination device 6 discriminate authenticity and denomination of the coin during conveyance by the conveying device 9. The reject device 7 rejects a coin which has been discriminated to be a counterfeit coin by the discrimination device 6 from on the conveying surface 91. The coin which has been rejected by the reject device 7 is discharged to the outside through a path provided below the conveying surface 91.

The coin change machine 271 has the storage device 8 in the main body portion 210. The storage device 8 has a storage warehouse for storing coins. The storage warehouse of the storage device 8 includes a plurality of storage chambers which are partitioned for each denomination. An endless belt is provided on a bottom surface of each of the storage chambers. The storage device 8 stacks and stores coins which have been discriminated as genuine coins by the discrimination device 6 and have been conveyed by the conveying device 9, on the endless belts 81 of the storage chambers for each denomination. The endless belt 81 receives a drive force of a dispensing motor 58 (refer to FIG. 6), and thereby rotates.

The coin change machine 271 has drop sensors 62 between the conveying device 9 and the storage device 8. The drop sensor 62 is a transmission type sensor. The drop sensors 62 are provided for each denomination. The drop sensor 62 detects a coin which has been conveyed by the conveying device 9 and drops in the above-described storage chamber of the storage device 8, and outputs a detection signal. A control device 500 described later counts the above-described dropping coins for each denomination, based on the outputs from the drop sensors 62. In addition, the coin change machine 271 has a second conveying mechanism in the main body portion 210. The second conveying mechanism is a mechanism which conveys a coin stored in the storage device 8 to the dispensing port 273 or a storage bag described later. The second conveying mechanism includes the endless belts 81 of the storage device 8. Further, the second conveying mechanism has dispensing sensors 63, the dispensing port 273, the saucer 280, and a guide body 10. The dispensing sensor 63 is a material sensor to discriminate material of a coin. The dispensing sensors 63 are provided for each denomination, as shown in FIG. 3. The dispensing sensor 63 detects a coin which has been conveyed from the storage device 8 by the endless belt 81 and is to be paid, before the guide body 10 (refer to FIG. 4A and FIG. 4B), and outputs a detection signal. The control device 500 described later counts coins which have been paid from the storage device 8 and are guided by the guide body 10, and are to be paid to the dispensing port 273 for each denomination, based on the outputs from the dispensing sensors 63. That is, the control device 500 counts the change coins to be paid from the dispensing port 273 for each denomination, based on the outputs from the dispensing sensors 63. In addition, the control device 500 counts coins which have been paid from the storage device 8 and are guided by the guide body 10, and are to be discharged in the storage bag 200, for each denomination, based on the outputs from the dispensing sensors 63. That is, the control device 500 counts the coins to be discharged to the storage bag for each denomination, based on the outputs from the dispensing sensors 63.

The endless belts 81 support coins which have been stacked on the endless belts 81 for each denomination in the storage device 8. The endless belt 81 is rotated, to move a coin to the front surface side of the main body portion 210, and convey the coin to the dispensing port 273 via the guide body 10 described later. The dispensing port 273 is an outlet which, in order to dispense a change coin to a customer via the opening portion 278, pays the relevant coin from the inside of the coin change machine 271. The saucer 280 receives the coin which has been paid from the dispensing port 273.

Hereinafter, the guide body 10 will be described with reference to FIG. 4A and FIG. 4B. The guide body 10 shown in FIG. 4A and FIG. 4B switches a conveying destination of a coin to be paid from the storage device 8 to any of the dispensing port 273 and the storage bag 200. FIG. 4A and FIG. 4B are vertical cross sectional right side views showing a structure around the dispensing port 273 and the saucer 280. As shown in FIG. 4A and FIG. 4B, the guide body 10 is provided between the endless belt 81 and the dispensing port 273. In addition, the coin change machine 271 has the storage bag 200 and an attaching/detaching mechanism 204. The attaching/detaching mechanism 204 is provided below the saucer 280. The attaching/detaching mechanism 204 detachably supports the storage bag 200. The storage bag 200 is detachably attached to the attaching/detaching mechanism 204. The storage bag 200 is a bag into which, when the storage device 8 has overflowed, coins of the denomination stored in the overflowed storage device 8 are to be discharged. That is, the storage bag 200 stores coins which have been discharged from the overflowed storage device 8. In addition, the overflow indicates a state of the storage device 8 that the number of coins stored in the storage device 8 exceeds a prescribed upper limit number. The prescribed upper limit number is an upper limit number in which the coins stored in the storage device 8 become in a fully filled state, for example. The upper limit numbers are determined for each denomination.

As shown in FIG. 4A and FIG. 4B, the guide body 10 can rotate around an axis (not shown) within a definite range, in the clockwise direction and in the counterclockwise direction. FIG. 4A is a diagram showing a state that the guide body 10 has rotated in the clockwise direction. FIG. 4B is a diagram showing a state that the guide body 10 has rotated in the counterclockwise direction. The position of the guide body 10 is switched between a position shown in FIG. 4A and a position shown in FIG. 4B by a switching solenoid 59 (refer to FIG. 6).

The guide body 10 is a tubular body in which the inside is hollow, for example. The guide body 10 guides a coin to the dispensing port 273, while one outer surface of the tubular body serves as a guide surface 10a. The guide body 10 guides a coin to the storage bag 200, via a hollow portion 10b of the tubular body. When the guide body 10 is rotated in the clockwise direction and is moved to a position shown in FIG. 4A, a coin which has been conveyed by the endless belt 81 is guided by the guide surface 10a, and is carried out to the dispensing port 273 (refer to a direction of an arrow Y1 of FIG. 4A). In addition, when the guide body 10 is rotated in the counterclockwise direction and is moved to a position shown in FIG. 4B, a coin which has been conveyed by the endless belt 81 is guided by the hollow portion 10b, and is discharged to the storage bag 200 (refer to a direction of an arrow Y2 of FIG. 4B).

As described above, the storage bag 200 is detachably attached to the attaching/detaching mechanism 204 below the saucer 280. The storage bag 200 has a bag 201 and a frame 202. The bag 201 stores a coin discharged from the storage device 8. The frame 202 keeps the bag 201 in the opened state. The frame 202 has a grip portion 203. The grip portion 203 is a handle for performing attachment/detachment of the storage bag 200. In addition, the coin change machine 271 has a storage bag sensor 65. The storage bag sensor 65 is provided at a position adjacent to the attaching/detaching mechanism 204. The storage bag sensor 65 detects attachment/detachment of the storage bag 200 to the attaching/detaching mechanism 204. The storage bag sensor 65 outputs a signal indicating that the storage bag 200 is attached, or a signal indicating that the storage bag 200 is not attached.

When the storage device 8 has not overflowed, the coin change machine 271 rotates the guide body 10 in the clockwise direction, to discharge a coin stored in the storage device 8 via the dispensing port 273 to the saucer 280. On the other hand, when the number of the coins stored in the storage device 8 overflows, the coin change machine 271 rotates the guide body 10 in the counterclockwise direction, to discharge the coin stored in the storage device 8 to the storage bag 200.

Hereinafter, hardware configurations of the self POS terminal 1 and the coin change machine 271 will be described. FIG. 5 is a block diagram showing a hardware configuration of the self POS terminal 1. As shown in FIG. 5, the self POS terminal 1 has the control device 100 and a memory device 14. The control device 100 has a CPU (Central Processing Unit) 11, a ROM (Read Only Memory) 12, and a RAM (Random Access Memory) 13. The CPU 11 serves as a control subject. The ROM 12 stores various programs. The RAM 13 expands various data. The memory device 14 stores various programs. The CPU 11, the ROM 12, the RAM 13, the memory device 14 are connected to each other via a data bus 15. The control device 100 operates in accordance with the control programs which have been read from the ROM 12 or the memory device 14 and expanded in the RAM 13 by the CPU 11, to execute a control processing described later.

The memory device 14 includes a non-volatile memory in which storage information is held even if a power source is turned off, such as an HDD (Hard Disc Drive) or a flash memory. The memory device 14 has a control program partition 141 to store the control programs.

In addition, the control device 100 connects to the touch panel 21, the display device 22, the commodity reading device 23, the printer 24, the first measuring device 251, the second measuring device 261, the coin change machine 271, the bill change machine 272, the card reading device 28, and the light emitting device 29, via the data bus 15 and a controller 16.

The touch panel 21 has keys corresponding to the display of keys of the display device 22, such as a start key 211, and an end key 212. The start key 211 is operated, when a customer starts an operation for sales registration processing of a commodity. The end key 211 is operated, when the customer ends a sales registration operation of a commodity. When the end key 212 is operated, the self POS terminal 1 starts a settlement processing.

In addition, the control device 100 connects to the first electromagnetic lock 30 and the second electromagnetic lock 31, via the data bus 15 and the controller 16.

In addition, the control device 100 connects to a communication device 36 via the data bus 15. The communication device 36 connects to the other self POS terminal 1 or the attendant PC 2 via the communication line NT.

The attendant PC 2 is a computer having a control device, a memory device, and a display device and so on which are not shown. The control device includes a CPU, a ROM, and a RAM. The memory device stores a control program. That is, the control device executes a control processing described later, based on the control program. In addition, the display device displays whether or not the storage bag 200 is attached to the coin change machine 271.

Figure 6:
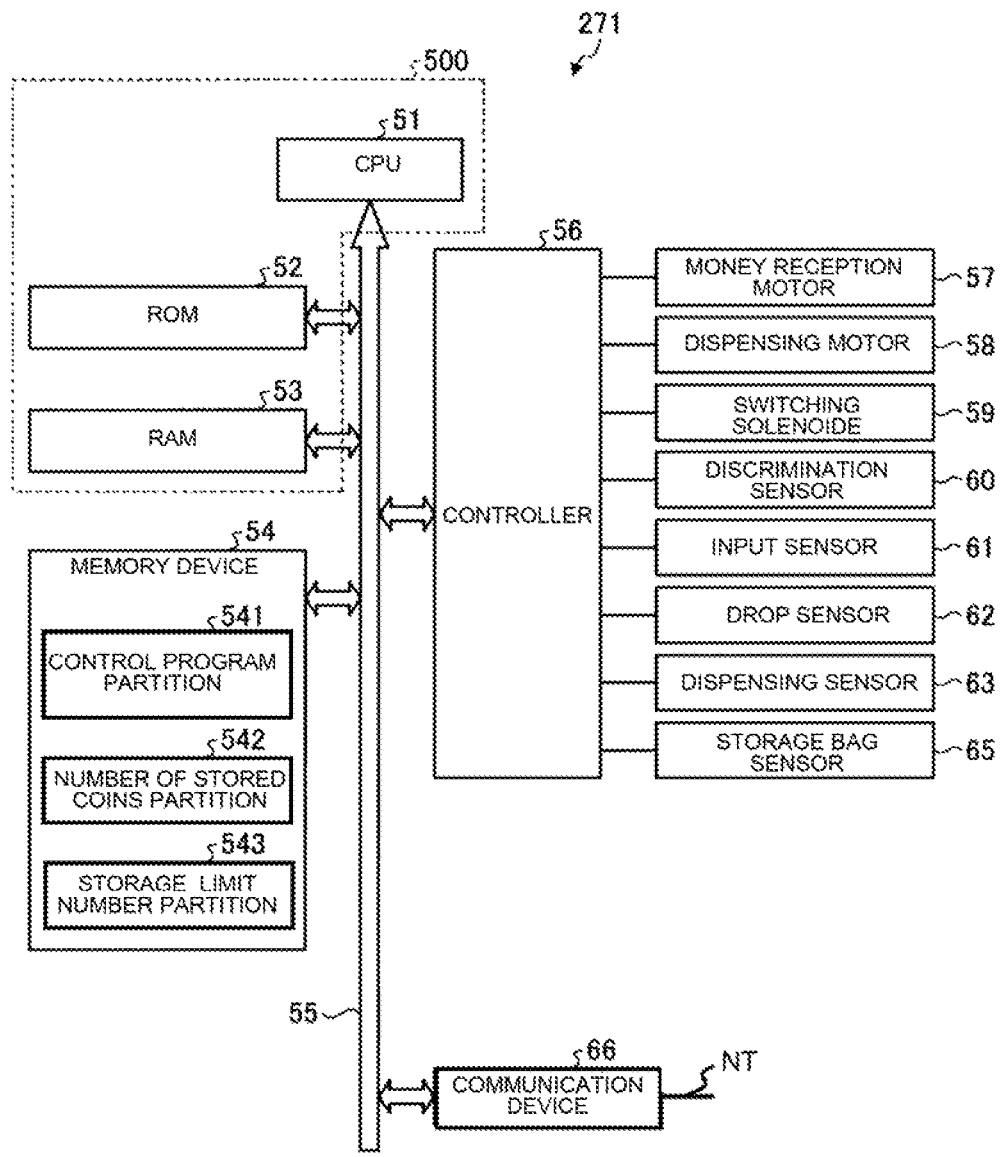
FIG. 6 is a block diagram showing a hardware configuration of the coin change machine according to the embodiment.

FIG. 6 is a block diagram showing a hardware configuration of the coin change machine 271. In FIG. 6, the coin change machine 271 has the control device 500 and a memory device 54 and so on. The control device 500 includes a CPU 51, a ROM 52, and a RAM 53. The CPU 51 is a control subject of the coin change machine 271. The ROM 52 stores various programs. The RAM 53 expands various data. The memory device 54 stores various programs. The CPU 51, the ROM 52, the RAM 53, the memory device 54 are connected to each other via a data bus 55. That is, the control device 500 operates in accordance with the control programs which have been read from the ROM 52 or the memory device 54 and expanded in the RAM 53 by the CPU 51, to execute a control processing described later.

The memory device 54 includes a non-volatile memory in which storage information is held even if a power source is turned off, such as an HDD or a flash memory. The memory device 54 has a control program partition 541, a number of stored coins partition 542, and a storage limit number partition 543. The control program partition 541 stores a control program. The number of stored coins partition 542 stores the numbers of coins stored in the storage device 8 for each denomination. In addition, the number of stored coins partition 542 stores money amounts of the coins stored in the storage device 8 for each denomination. Further, the number of stored coins partition 542 also stores a total money amount of the coins stored in the storage device 8. The storage limit number partition 543 stores the above-described upper limit numbers of coins which can be stored in the respective storage chambers of the storage device 8 for each denomination. The upper limit numbers may be different for each denomination.

In addition, the control device 500 is connected to the money reception motor 57, the dispensing motor 58, the switching solenoid 59, the discrimination sensor 60, the input sensor 61, the drop sensor 62, the dispensing sensor 63, and the storage bag sensor 65, via the data bus 55 and a controller 56. The money reception motor 57 drives the conveying belt 92, so as to convey a coin received from the money reception port 3 to the storage device 8. The dispensing motor 58 drives the endless belt, 81 so as to convey a coin stored in the storage device 8 to the dispensing port 273.

In addition, the control device 500 connects to a communication device 66, via the data bus 55. The communication device 66 connects to the controller 16 via the communication cable NC.

Figure 7:
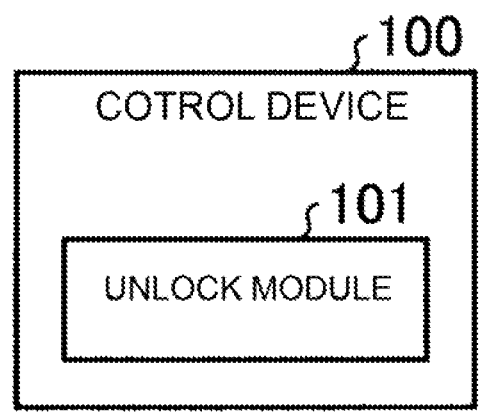
FIG. 7 is a functional block diagram showing a functional configuration of the self POS terminal according to the embodiment.

Hereinafter, control of the self POS terminal 1 and the coin change machine 271 will be described in detail with reference to FIG. 7 to FIG. 10. FIG. 7 is a functional block diagram showing a functional configuration of the self POS terminal 1. The control device 100 follows the control programs stored in the ROM 12, and the control program partition 141 of the memory device 14, and thereby functions as various control modules. For example, the control device 100 executes the above-described control programs, to function as an unlock module 101.

The unlock module 101 makes the first electromagnetic lock 30 in an unlock state, on condition that a signal indicating collection of the storage bag 200 from the coin change machine 271 is inputted.

Figure 8:
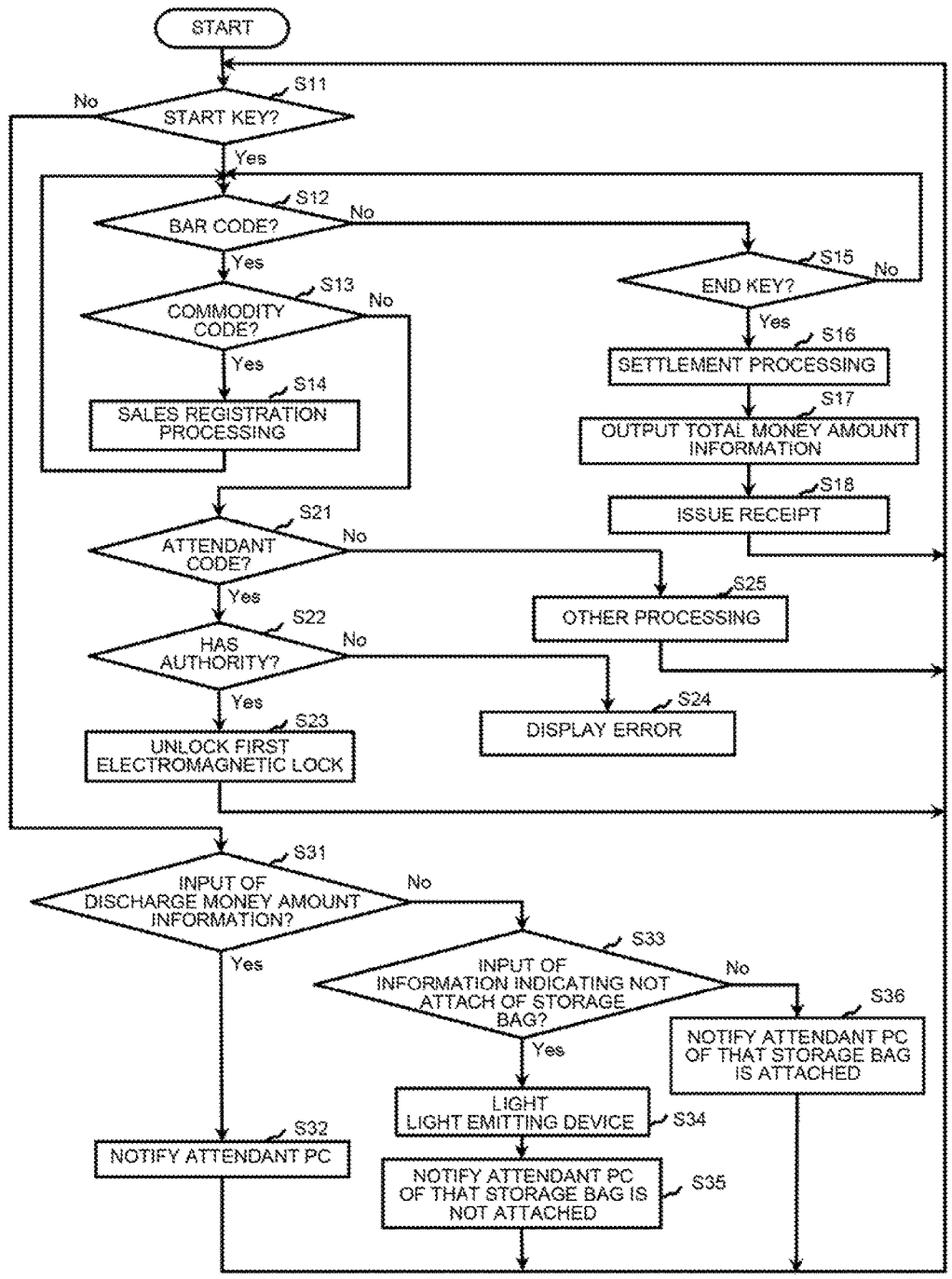
FIG. 8 is a flow chart showing a control processing of the self POS terminal according to the embodiment.

FIG. 8 is a flow chart showing a control processing of the self POS terminal 1. As shown in FIG. 8, in a step S11, the control device 100 judges whether or not the start key 211 has been operated. When it is judged that the start key 211 has been operated (Yes in step S11), the processing of the control device 100 proceeds to a step S12. In the step S12, the control device 100 judges whether or not a bar code attached to a commodity has been read by the commodity reading device 23. When it is judged that the bar code has been read (Yes in step S12), the processing of the control device 100 proceeds to a step S13. In the step S13, the control device 100 judges whether or not a commodity code to identify a commodity has been acquired from the relevant bar code. When it is judged that the commodity code has been acquired (Yes in step S13), the processing of the control device proceeds to a step S14. In the step S14, the control device 100 executes a sales registration processing regarding the relevant commodity. In the step S14, the control device 100 stores the commodity information (commodity name, price, and so on) of the commodity which has been subjected to the sales registration processing, in the commodity information partition 131. And the processing of the control device 100 returns to the step S12.

In addition, when it is judged that the bar code has not been read (No in step S12), the processing of the control device 100 proceeds to a step S15. In the step S15, the control device 100 judges whether or not the end key 212 has been operated. When it is judged that the end key 212 has been operated (Yes in step S15), the processing of the control device 100 proceeds to a step S16. In the step S16, the control device 100 executes a settlement processing based on the commodity information stored in the commodity information partition 131. And in a step S17, the control device 100 outputs the total money amount information of the relevant transaction calculated in the settlement processing to the coin change machine 271 and the bill change machine 272. Next, in a step S18, the control device 100 issues a receipt printed with the commodity information, the total money amount information, the settlement information, and so on. The settlement information is information based on the received money information and the change information which have been received from the coin change machine 271 and the bill change machine 272. And the processing of the control device 100 returns to the step S11. In addition, when it is judged that the end key has not been operated (No in step S15), the processing of the control device 100 returns to the step S12.

On the other hand, when it is judged that the commodity code has not been acquired in the step S13 (No in step S13), the processing of the control device 100 proceeds to a step S21. In the step S21, the control device 100 judges whether or not a bar code including an attendant code has been acquired by the commodity reading device 23. For example, an attendant who operates the attendant PC 2 puts on a nameplate. A barcode including an attendant code is printed on the nameplate. The attendant code is a code for identifying an attendant. When the above-described bar code is read from the nameplate by the commodity reading device 23, the control device 100 judges that the attendant code has been acquired. When it is judged that the attendant code has been acquired (Yes in step S21), the processing of the control device 100 proceeds to a step S22. In the step S22, the control device 100 judges whether or not the acquired attendant code is an attendant code of an attendant having authority to open the first door 411 of the self POS terminal 1. When it is judged that the acquired attendant code is an attendant code of an attendant having the above-described authority (Yes in step S22), the processing of the control device 100 proceeds to a step S23. In the step S23, the control device 100 (unlock module 101) makes the first electromagnetic lock 30 to be in an unlock state. Accordingly, it becomes possible to open the first door 411. And the processing of the control device 100 returns to the step S11.

In addition, when it is judged that the acquired attendant code is an attendant code of an attendant who does not have authority to open the first door 411 (No in step S22), the processing of the control device 100 proceeds to a step S24. In the step 24, the control device 100 makes the display device 22 display an error message indicating that the attendant does not have the above-described authority. And the processing of the control device 100 returns to the step S11. In addition, when it is judged that the attendant code has not been acquired in the step S21 (No in step S21), the processing of the control device 100 proceeds to a step S25. In the step S25, the control device 100 executes other processing. And the processing of the control device 100 returns to the step S11.

In addition, when it is judged that the start key 211 has not been operated in the step S11 (No in step S11), the processing of the control device 100 proceeds to a step S31. In the step S31, the control device 100 judges whether or not discharge money amount information has been inputted. The discharge money amount information is inputted from the coin change machine 271 as described later (refer to step S68 of FIG. 10). The discharge money amount information is information including a money amount of coins (discharge money amount) discharged to the storage bag 200. When it is judged that the discharge money amount information has been inputted (Yes in step S31), the processing of the control device 100 proceeds to a step S32. In the step S32, the control device 100 transmits the above-described inputted discharge money amount information to the attendant PC 2. The attendant PC 2 which has received the discharge money amount information displays the discharge money amount information on a monitor screen of the relevant self POS terminal 1. And the processing of the control device 100 returns to the step S11.

On the other hand, when it is judged that the discharge money amount information has not been inputted from the coin change machine 271 (No in step S31), the processing of the control device 100 proceeds to a step S33. In the step S33, the control device 100 judges whether or not information indicating that the storage bag 200 is not attached has been inputted to the coin change machine 271. When it is judged that the information indicating that the storage bag 200 is not attached has been inputted (Yes in step S33), the processing of the control device 100 proceeds to a step S34. In the step S34, the control device 100 makes the light emitting device 29 to be lighted (or blinked) on red. And, in a step S35, the control device 100 transmits the information indicating that the storage bag 200 is not attached, to the attendant PC 2. The attendant PC 2 which has received the information indicating that the storage bag 200 is not attached displays a message indicating that the storage bag 200 is not attached on a monitor screen of the relevant self POS terminal 1. And the processing of the control device 100 returns to the step S11. In addition, when it is judged that the information indicating that the storage bag 200 is not attached has not been inputted to the coin change machine 271 (No in step S33), the processing of the control device 100 proceeds to a step S36. In the step S36, the control device 100 transmits information indicating that the storage bag 200 is attached, to the attendant PC 2. The attendant PC 2 which has received the information indicating that the storage bag 200 is attached displays a message or a mark indicating that the storage bag 200 is attached, on the monitor screen of the relevant self POS terminal 1. And the processing of the control device 100 returns to the step S11.

Figure 9:
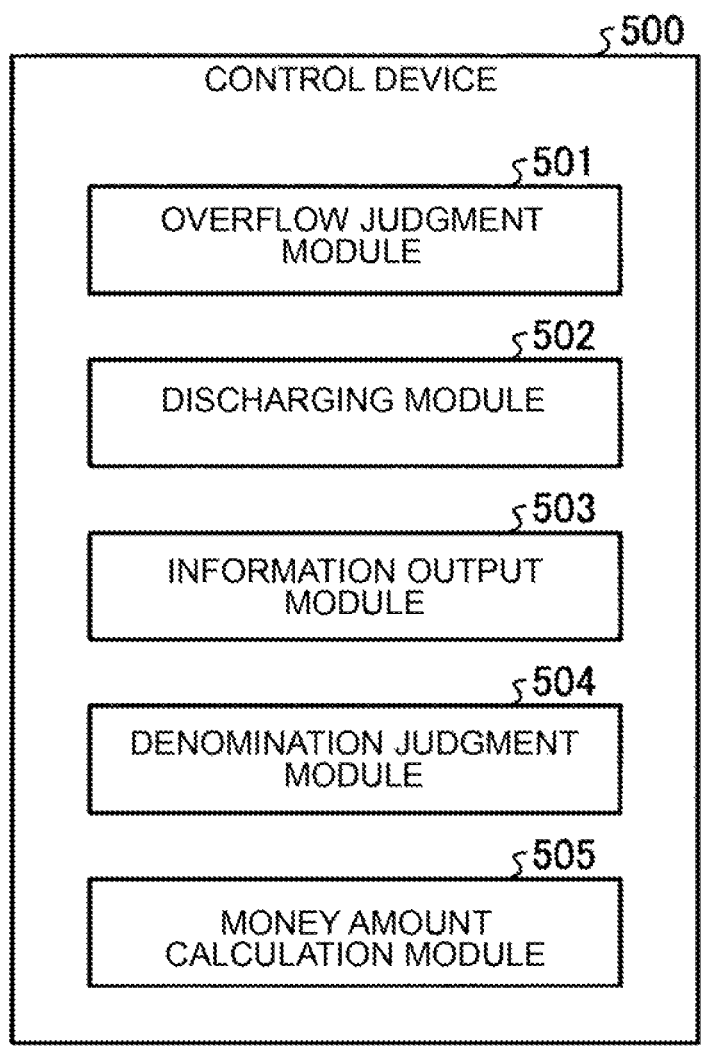
FIG. 9 is a functional block diagram showing a functional configuration of the coin change machine according to the embodiment.

FIG. 9 is a functional block diagram showing a functional configuration of the coin change machine 271. The control device 500 follows the control programs stored in the ROM 52 and the control program partition 541 of the memory device 54, to function as various control modules. For example, the control device 500 executes the above-described control programs, to function as an overflow judgment module 501, a dispensing module 502, an information output module 503, a denomination judgment module 504, and a money amount calculation module 505.

The overflow judgment module 501 has a function to judge that the storage device 8 overflows. That is, the control device 500 subtracts the number of coins counted by the dispensing sensor 63 from the number of coins counted by the drop sensor 62, for each denomination. The control device 500 compares the number of coins obtained by the above-described subtraction with the above-described upper limit number for each denomination stored in the storage limit number partition 543. As a result of the above-described comparison, regarding the denomination in which the above-described obtained number of coins exceeds the upper limit number, the control device 500 judges that the storage warehouse (storage chamber) of the relevant denomination of the storage device 8 has overflowed. The dispensing module 502 pays a coin stored in the storage device 8 as change into the dispensing port 273. Further, the dispensing module 502 discharges coins in the storage chamber (storage device 8) of the denomination in which that the storage chamber has overflowed is judged by the overflow judgment module 501 into the storage bag 200 attached to the attaching/detaching mechanism 204. The information output module 503 outputs information indicating that the storage bag 200 is not attached, on condition that the storage bag 200 is not attached to the attaching/detaching mechanism 204. The denomination judgment module 504 judges denomination of the coin discharged in the storage bag 200 by the dispensing module 502. The money amount calculation module 505 calculates a money amount of the coins discharged in the storage bag 200, based on the denomination of the coin judged by the denomination judgment module 504.

Figure 10:
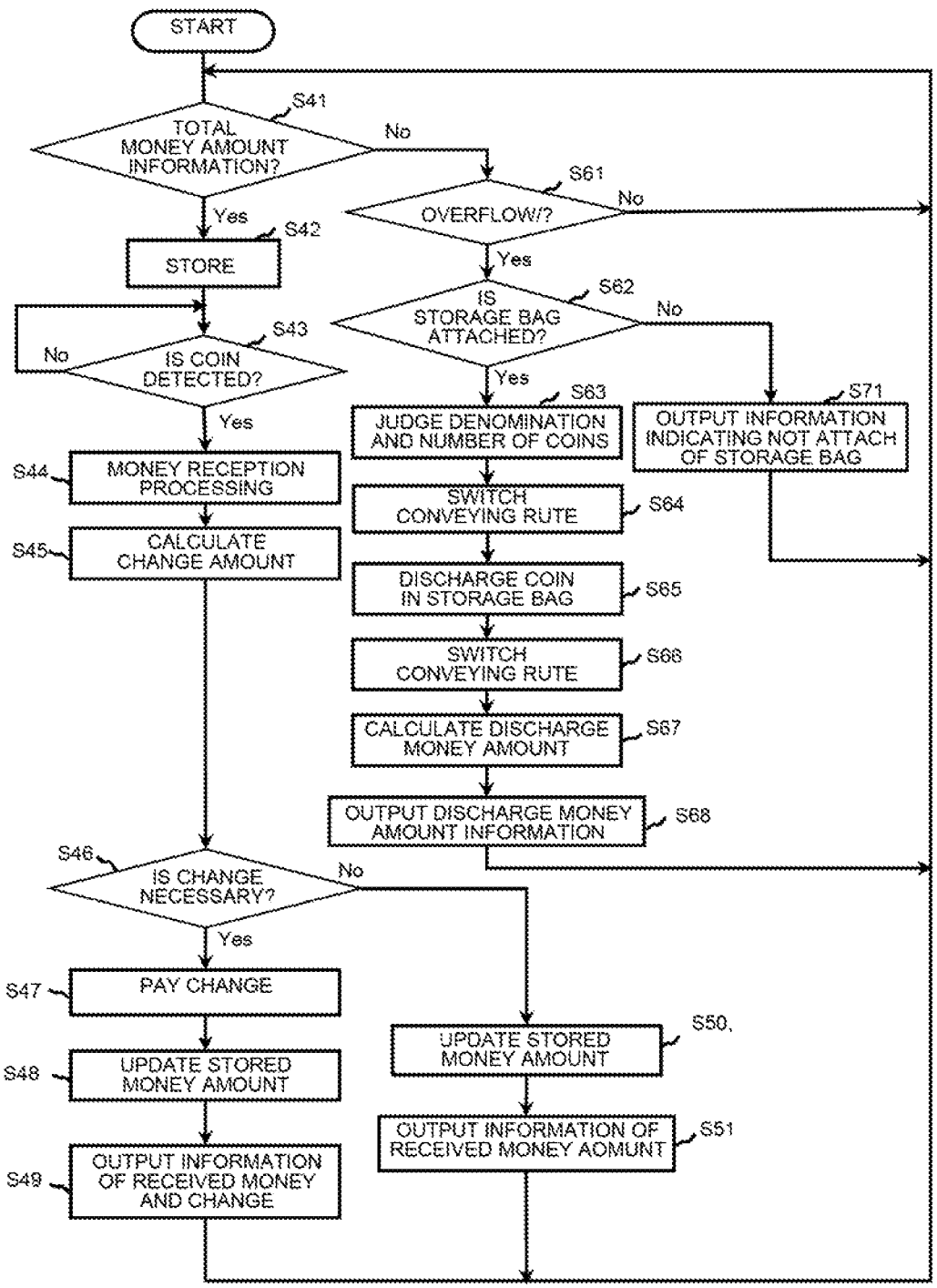
FIG. 10 is a flow chart showing a flow of a control processing of the coin change machine according to the embodiment.

FIG. 10 is a flow chart showing a control processing of the coin change machine 271. In addition, in the coin change machine 271, the switching solenoid 59 is not energized in the initial state. For this reason, the guide body 10 is rotated in the clockwise direction, and is in the state shown in FIG. 4A. As shown in FIG. 10, in a step S41, the control device 500 judges whether or not the total money amount information (refer to step S17 of FIG. 8) has been inputted from the self POS terminal 1. When it is judged that the above-described total money amount information has been inputted (Yes in step S41), the processing of the control device 500 proceeds to a step S42. In the step S42, the control device 500 stores the above-described total money amount information in the RAM 53. Next, in a step S43, the control device 500 judges whether or not a coin inputted from the opening portion 2711 to the money reception port 3 has been detected by the input sensor 61. As described above, input sensor 61 is provided at the money reception port 3. The control device 500 waits until the coin is detected by the input sensor 61 (No in step S43). When it is judged that the coin has been detected by the input sensor 61 (Yes in step S43), the processing of the control device 500 proceeds to a step S44. In the step S44, the control device 500 drives the carrying-in belt 32 and the conveying belt 92, to execute a money reception processing. The above-described inputted coin is conveyed to the storage device 8 by this money reception processing, and drops in the storage chamber of the relevant denomination of the storage device 8, and is stored in the relevant storage chamber. When the coin drops in the storage chamber of the storage device 8, the drop sensor 62 detects the dropping coin. The drop sensor 62 outputs a voltage corresponding to the detected coin. The control device 500 counts the numbers of the dropped coins for each denomination, based on the outputs of the drop sensors 62, to calculate a received money amount. The above-described money reception processing further includes a calculation processing of this received money amount.

Next, in a step S45, the control device 500 calculates a change amount by subtracting the total money amount included in the above-described total money amount information (refer to step S42) from the above-described calculated received money amount. And in a step S46, the control device 500 judges whether change is necessary or not. When it is judged that change is necessary (Yes in step S46), the processing of the control device 500 proceeds to a step S47. In the step S47, the control device 500 (dispensing module 502) drives the endless belts 81, to pay only the required numbers of coins of the respective denominations corresponding to the change amount from the storage device 8. The paid coins are guided by the guide surface 10*a* of the guide body 10, and are payed to the dispensing port 273 (refer to a direction of the arrow Y1).

At this time, the dispensing sensor 63 outputs a voltage corresponding to the discharged coin. The control device 500 counts the coins paid to the dispensing port 273, based on the outputs from the dispensing sensors 63 for each denomination. In addition, the control device 500 subtracts the numbers of the above-described paid coins from the numbers of the above-described dropped coins for each denomination. The control device 500 calculates the numbers of the coins and money amounts thereof stored in the storage device 8 for each denomination by this subtraction. And in a step S48, the control device 500 updates the numbers of the coins stored in the number of stored coins partition 542 for each denomination. At this time, the control device 500 also updates the stored money amounts for each denomination and the total money amount stored in the number of stored coins partition 542. And in a step S49, the control device 500 outputs the above-described received money amount (refer to step S44) and the above-described change amount (refer to steps S45, S47) to the self POS terminal 1. And the processing of the control device 500 returns to the step S41.

In addition, when it is judged that change is not necessary (No in step S46), the processing of the control device 500 proceeds to a step S50. In the step S50, the control device 500 updates the numbers of the coins for each denomination, the stored money amounts for each denomination, and the total money amount which are stored in the number of stored coins partition 542, based on the above-described calculated received money amount (refer to step S44). And in a step S51, the control device 500 outputs the above-described calculated received money amount (refer to step S44), and that change is not necessary to the self POS terminal 1. And the processing of the control device 500 returns to the step S41.

On the other hand, when it is judged that the total money amount information has not been inputted from the self POS terminal 1 (No in step S41), the processing of the control device 500 proceeds to a step S61. In the step S61 (does storage device overflow?), the control device 500 (overflow judgment module 501) compares the number of the coins stored in the number of stored coins partition 542 of the memory device 54 with the upper limit number of the coins stored in the storage limit number partition 543, to judge whether or not the storage 8 overflows. For example, the control device 500 judges whether or not the storage device 8 overflows for each storage chamber (for each denomination). This comparison may be comparisons of the money amounts for each denomination or comparison of the total money amount of coins stored in the storage device 8, in place of the comparison of the number of the coins. When there is at least one storage chamber in which the number of the coins stored in the number of stored coins partition 542 exceeds the upper limit number of the coins stored in the storage limit number partition 543, the control device 500 judges that the storage device 8 overflows. When it is judged that the storage device 8 overflows (Yes in step S61), the processing of the control device 500 proceeds to a step S62. In the step S62, the control device 500 judges whether or not the storage bag 200 is attached to the attaching/detaching mechanism 204 of the coin change machine 271, from the output of the storage bag sensor 65. When it is judged that the storage bag 299 is attached to the attaching/detaching mechanism 204 of the coin change machine 271 (Yes in step S62), the processing of the control device 500 proceeds to a step S63. In the step S63, the control device 500 judges a denomination of the overflowed storage chamber, and the number of the coins stored in the relevant storage chamber.

And in a step S64, the control device 500 (switch means) energizes the switching solenoid 59 to rotate the guide body 10 in the counterclockwise direction, and to locate it in the state shown in FIG. 4B. That is, the control device 500 (switch means) changes the position of the guide body 10, to switch the conveying route of a coin. And in a step S65, the control device 500 (dispensing module 502) drives the endless belt 81, to discharge coins into the storage bag 200 via the guide body 10, based on the denomination and the number of coins judged as described above (refer to step S63). In addition, the control device 500 may discharge coins of not less than the above-described calculated money amount to the storage bag 200. And in a step S66, the control device 500 stops energization of the switching solenoid 59, to rotate the guide body 10 in the clockwise direction, and to locate it in the state shown in FIG. 4A. That is, the control device 500 (switch means) changes the position of the guide body 10, to switch the conveying route of a coin. Next, in a step S67, the control device 500 (denomination judgment module 504, money amount calculation module 505) judges the denomination of the coin detected by the dispensing sensor 63, to calculate a discharge money amount discharged to the storage bag 200. And in a step S68, the control device 500 outputs discharge money amount information including the denomination of the coin discharged into the storage bag 200, and the above-described calculated discharge money amount to the self POS terminal 1. And the processing of the control device 500 returns to the step S41.

In addition, in the step S62, when it is judged that the storage bag 200 is not attached to the attaching/detaching mechanism 204 of the coin change machine 271 (No in step S62), the processing of the control device 500 proceeds to a step S71. In the step S71, the control device 500 (information output module 503) outputs information indicating that the storage bag 200 is not attached to the attaching/detaching mechanism 204 to the self POS terminal 1. And the processing of the control device 500 returns to the step S41. In addition, when it is judged that the storage device 8 does not overflow (No in step S61), the processing of the control device 500 returns to the step S41.

According to the above-described embodiment, the control device 500 of the coin change machine 271 outputs that the storage bag 200 is not attached to the coin change machine 271 to the self POS terminal 1. In addition, the self POS terminal 1 transmits the information indicating that the storage bag 200 is not attached to the coin change machine 271 to the attendant PC 2. The attendant PC 2 displays the information indicating that the storage bag 200 is not attached to the coin change machine 271. For this reason, an attendant can easily recognize the coin change machine 271 to which the storage bag 200 is not attached.

In addition, according to the above-described embodiment, when attaching the storage bag 200 to the coin change machine 271, an attendant makes the commodity reading device 23 read an attendant code of a nameplate which the attendant puts on. The attendant makes the commodity reading device 23 read the attendant code, and thereby can unlock the first electromagnetic lock 30 for opening the first door 411. For the reason, the attendant can easily attach the storage bag 200 to the coin change machine 271 to which storage bag 200 is not attached.

In addition, in the above-described embodiment, when the storage bag 200 is not attached to the coin change machine 271, the coin change machine 271 outputs the information indicating that the storage bag 200 is not attached, to the self POS terminal 1. In contrast, when the storage bag 200 is attached to the coin change machine 271, the coin change machine 271 may output information indicating that the coin bag 200 is attached, to the self POS terminal 1.

In the above-described embodiment, in the case that the storage bag 200 is not attached to the coin change machine 271, when it is judged that the storage device 8 overflows, the information indicating that the storage bag 200 is not attached, to the self POS terminal 1. In contrast, in the case that the storage bag 200 is not attached to the coin change machine 271, when it is judged that the storage device 8 does not overflow, the coin change machine 271 may output information indicating that the storage bag 200 is not attached, to the self POS terminal 1.

In the above-described embodiment, when the storage bag 200 is not attached to the coin change machine 271, the self POS terminal 1 transmits information indicating that the storage bag 200 is not attached, to the attendant PC 2. And when the storage bag 200 is attached to the coin change machine 271, the self POS terminal 1 transmits information indicating that the storage bag 200 is attached, to the attendant PC 2. In contrast, only when the storage bag 200 is not attached to the coin change machine 271, the self POS terminal 1 may transmit information indicating that the storage bag 200 is not attached, to the attendant PC 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A money dispensing device, comprising:
   a storage device which stores received money;
   a dispensing port from which a required change amount of money is dispensed out of the money stored in the storage device;
   an attaching/detaching mechanism which detachably supports a storage bag to which an excess amount of money is dispensed out of the money stored in the storage device;
   a conveying mechanism which conveys the money stored in the storage device to the dispensing port or to the storage bag attached to the attaching/detaching mechanism;
   a sensor which detects a number and denomination of money conveyed from the storage unit to the storage bag; and
   a control device which
      controls the conveying mechanism so that the required change amount of money is conveyed from the storage device to the dispensing port,
      calculates, based on the number and denomination of money detected by the sensor, an amount of money conveyed from the storage unit to the storage bag,
      controls the conveying mechanism so that the excess amount of money is conveyed from the storage device to the storage bag, the excess amount of money being an amount of the received money stored in the storage device in excess of a predetermined amount,
      outputs information indicating the calculated amount of money conveyed from the storage unit to the storage bag, and
      outputs information indicating that the storage bag is not attached when the storage bag is not attached to the attaching/detaching mechanism.

2. The money dispensing device according to claim 1, wherein:
   each of a plurality of storage chambers of the storage device store the received money for each denomination.

3. The money dispensing device according to claim 2, wherein:
   the control device determines whether the storage device includes, for each denomination, the excess amount of money.

4. The money dispensing device according to claim 3, wherein:
   the control device controls the conveying mechanism to convey the determined excess amount of money for each denomination to the storage bag.

5. The money dispensing device according to claim 1, wherein the sensor is a first sensor, the money dispensing device further comprising:
   a second sensor which detects an amount and denomination of money stored in the storage device;
   wherein the control device determines whether the storage device stores the excess amount of money based on a detection result of the first sensor.

6. The money dispensing device according to claim 1, further comprising:
   a second sensor which detects the storage bag attached to the attaching/detaching mechanism;
   wherein the control device determines whether or not the storage bag is attached to the attaching/detaching mechanism, based on a detection result of the second sensor.

7. The money dispensing device according to claim 1, wherein the control device:
   determines a denomination of the money conveyed to the storage bag, and
   calculates a value of the money conveyed to the storage bag, based on the determined denomination of the money.

8. An accounting device, comprising:
   a chassis;
   a money dispensing device provided in the chassis;
   a door provided on the chassis;
   a lock mechanism which is moveable between an unlock state in which the door is openable, and in a lock state in which the door is unopenable; and
   a first control device which moves the lock mechanism to the unlock state, when predetermined information is input; wherein
   the money dispensing device includes:
      a storage device which stores received money,
      a dispensing port from which a required change amount of money is dispensed out of the money stored in the storage device,
      an attaching/detaching mechanism which detachably supports a storage bag to which an excess amount of money is dispensed out of the money stored in the storage device,
      a conveying mechanism which conveys the money stored in the storage device to the dispensing port or the to storage bag attached to the attaching/detaching mechanism,
      a sensor which detects a number and denomination of money conveyed to the storage bag, and a second control device which
   controls the conveying mechanism so that the required change amount of money is conveyed from the storage device to the dispensing port,
   calculates, based on the number and denomination of money detected by the sensor, an amount of money conveyed to the storage bag,
   controls the conveying mechanism so that the excess amount of money is conveyed from the storage device to the storage bag, the excess amount of money being an amount of the received money stored in the storage device in excess of a predetermined amount,
   outputs information indicating the calculated amount of money conveyed to the storage bag, and
   outputs information indicating that the storage bag is not attached when the storage bag is not attached to the attaching/detaching mechanism.

9. The accounting device according to claim 8, wherein:
   the predetermined information includes a signal indicating collection of the storage bag from the money dispensing device.

10. The accounting device according to claim 8, wherein:
   the first control device moves the lock mechanism to the unlock state when a code which identifies a person having authority to unlock the lock mechanism is input.

11. The accounting device according to claim 8, further comprising:
   a display device which displays a state of the accounting device;
   wherein, when the storage bag is not attached to the attaching/detaching mechanism, the first control device controls the display device to display information indicating that the storage bag is not attached to the attaching/detaching mechanism, based on the information indicating that the storage bag is not attached output from the second control device.

* * * * *